(12) United States Patent
Zhang et al.

(10) Patent No.: US 10,664,102 B2
(45) Date of Patent: May 26, 2020

(54) METHOD AND APPARATUS FOR RESPONDING TO TOUCH OPERATION, STORAGE MEDIUM AND TERMINAL

(71) Applicant: GUANGDONG OPPO MOBILE TELECOMMUNICATIONS CORP., LTD., Dongguan, Guangdong (CN)

(72) Inventors: Qiang Zhang, Guangdong (CN); Mingqiang Guo, Guangdong (CN); Tong Han, Guangdong (CN); Hao Wang, Guangdong (CN); Rendong Shi, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 147 days.

(21) Appl. No.: 16/031,712

(22) Filed: Jul. 10, 2018

(65) Prior Publication Data

US 2019/0034054 A1      Jan. 31, 2019

(30) Foreign Application Priority Data

Jul. 28, 2017   (CN) .......................... 2017 1 0632515

(51) Int. Cl.
*G06F 3/041*     (2006.01)
*G06F 1/3228*    (2019.01)
(Continued)

(52) U.S. Cl.
CPC .......... *G06F 3/0418* (2013.01); *G06F 1/3228* (2013.01); *G06F 1/3278* (2013.01); *G06F 3/0488* (2013.01)

(58) Field of Classification Search
CPC ........................... G06F 3/0418; G06F 3/0488
See application file for complete search history.

(56) References Cited

U.S. PATENT DOCUMENTS

2012/0249449 A1    10/2012  Tseng et al.
2015/0035767 A1*   2/2015   Chen ..................... G06F 3/0416
                                                    345/173
(Continued)

FOREIGN PATENT DOCUMENTS

CN       103840526       6/2014
CN       103995618       8/2014
(Continued)

OTHER PUBLICATIONS

EPO, Office Action for EP Application No. 18185558, dated Nov. 20, 2018.
(Continued)

*Primary Examiner* — Glenn A. Auve
(74) *Attorney, Agent, or Firm* — Hodgson Russ LLP

(57) ABSTRACT

Embodiments of the present disclosure disclose a method and an apparatus for responding to a touch operation, a storage medium and a terminal. The method includes: when a plurality of touch points are detected on a touch screen of a terminal, determining whether the terminal is in a charging mode currently; when the terminal is in the charging mode, determining a trip point from the plurality of touch points; and preventing the trip point from being responsive and allowing touch points other than the trip point in the plurality of touch points to be responsive.

19 Claims, 6 Drawing Sheets

(51) Int. Cl.
G06F 1/3234 (2019.01)
G06F 3/0488 (2013.01)

(56) References Cited

U.S. PATENT DOCUMENTS

| | | | |
|---|---|---|---|
| 2015/0193070 A1* | 7/2015 | Tilak | G06F 3/0416 |
| | | | 345/173 |
| 2015/0370410 A1* | 12/2015 | Sauer | G06F 3/044 |
| | | | 345/173 |
| 2017/0063145 A1 | 3/2017 | Von Novak, III et al. | |
| 2017/0147134 A1 | 5/2017 | Jiang et al. | |
| 2017/0220189 A1* | 8/2017 | Guo | G06F 3/0418 |

FOREIGN PATENT DOCUMENTS

| | | |
|---|---|---|
| CN | 104808847 | 7/2015 |
| CN | 105404416 | 3/2016 |
| CN | 106681555 | 5/2017 |
| CN | 107402675 | 11/2017 |
| WO | 2014127716 | 8/2014 |

OTHER PUBLICATIONS

WIPO, English translation of the ISR and WO for PCT/CN2018/097240, dated Oct. 29, 2018.
SIPO, First Office Action for CN Application No. 201710632515, dated Feb. 28, 2019.

* cited by examiner

METHOD AND APPARATUS FOR RESPONDING TO TOUCH OPERATION, STORAGE MEDIUM AND TERMINAL

CROSS-REFERENCE TO RELATED APPLICATION

The present application is based upon and claims priority to Chinese Patent Application No. 201710632515.7, filed on Jul. 28, 2017, the entire contents of which are incorporated herein by reference.

TECHNICAL FIELD

The present disclosure relates to a field of touch technology, and more particularly, to a method and an apparatus for responding to a touch operation, a storage medium and a terminal.

BACKGROUND

At present, a touch screen has become a standard configuration in most of terminals. A user of a terminal may perform operations on the terminal via the touch screen easily and quickly.

There are various touch operations based on the touch screen, such as a clicking operation, a long-pressing operation, a sliding operation and a dragging operation and the like, and different events or displaying content may be triggered via different touch operations. Due to a limitation of electric quantity of the terminal, the user usually uses the terminal during a charging process of the terminal.

SUMMARY

Embodiments of the present disclosure is to provide a method for responding to a touch operation, a storage medium and a terminal.

Embodiments of the present disclosure provide a method for responding to a touch operation. The method may include: when a plurality of touch points are detected on a touch screen of a terminal, determining whether the terminal is in a charging mode currently; when the terminal is in the charging mode, determining a trip point from the plurality of touch points; and preventing the trip point from being responsive and allowing touch points other than the trip point in the plurality of touch points to be responsive.

Embodiments of the present disclosure provide a computer-readable storage medium, having a computer program stored thereon, in which when the computer program is executed by a processor, the processor is caused to perform the method for responding to the touch operation as described in embodiments of the present disclosure.

Embodiments of the present disclosure provide a terminal, comprising a memory, a processor and a computer program stored on the memory and executable by the processor, in which when the processor executes the computer program, the processor is caused to perform the method for responding to the touch operation as described in embodiments of the present disclosure.

DETAILED DESCRIPTION

The technical solution of the present disclosure is further illustrated in combination with the accompanying drawings by specific implementations below. It should be understood that, the specific embodiments described herein are used merely for explaining the present invention, rather than limiting the present disclosure. It is also necessary to note that, for convenience of description, only a relative part of the present disclosure is illustrated in the accompanying drawings, instead of all of the structure.

Before discussing the exemplary embodiments in detail, it should be mentioned that some exemplary embodiments are described as processes or methods depicted as flow charts. Although a flow chart describes each step as sequential processing, many of these steps can be implemented in parallel, concurrently, or simultaneously. In addition, the steps can be reordered. The processing can be terminated when its operation is completed, but additional steps can be included in the accompany drawings. The processing may correspond to a method, a function, a procedure, a sub-procedure, a subprogram and the like.

Using the terminal with the touch screen in a charging mode may cause an error response to the touch operation, which may affect a normal use for the user. Therefore, an optimized solution for responding to the touch operation during the charging process of the terminal is desired.

Figure 1:
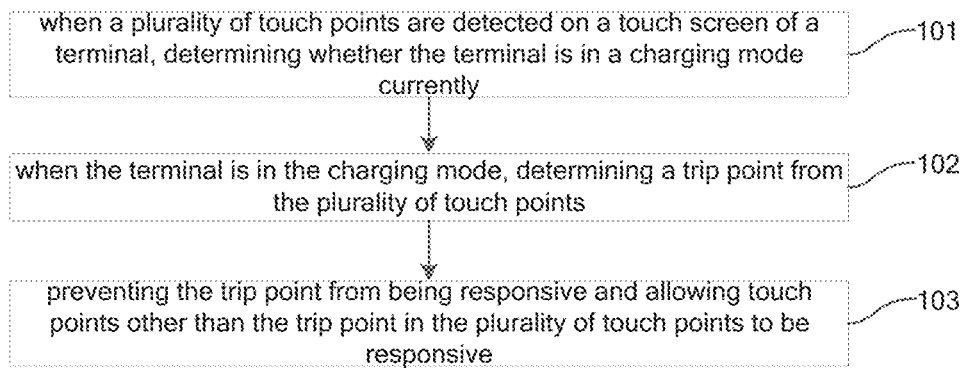
FIG. 1 is a flow chart of a method for responding to a touch operation provided by an embodiment of the present disclosure.

FIG. 1 is a flow chart of a method for responding to a touch operation provided by an embodiment of the present disclosure. The method may be performed by an apparatus for responding to a touch operation. The apparatus may be implemented by software and/or hardware and may be integrated in a terminal. As illustrated in FIG. 1, the method may include the followings.

At block 101, when a plurality of touch points are detected on a touch screen of a terminal, it is determined whether the terminal is in a charging mode currently.

In an embodiment, the terminal mentioned herein may include a device configured with a touch screen, such as a mobile phone, a tablet computer, a media player and a personal computer and the like.

In embodiments of the present disclosure, the plurality of touch points detected on the touch screen of the terminal may be a plurality of touch points detected in any interface displayed on the touch screen currently. The interface displayed on the touch screen may be a desktop, an application page, or the like. The application page may be a video playing page, a webpage viewing page, a chatting page and a payment page and the like.

In this embodiment, when the plurality of touch points are detected on the touch screen of the terminal, it is determined whether the terminal is in the charging mode currently. The terminal may detect the touch points as follows. After the touch screen receives a touch signal, the touch signal is converted to an electric pulse. The electric pulse is transferred to a touch screen control integrated circuit (IC) and for processing. The terminal may perform corresponding actions according to the processed touch signal, so as to respond to the touch signal, i.e., to realize a report of the touch point. If reported signals of the plurality of touch points are received, it indicates that the plurality of touch points are detected on the touch screen of the terminal. It may be determined whether the terminal is in the charging mode by a main control chip of the terminal cooperating with an anti-interference device for detection of the touch screen. In an embodiment, when the terminal is coupled to a power adapter (such as a charger, a power bank and the like), the power adapter may charge the battery of the terminal. At this time, the main control chip of the terminal may notify the anti-interference device for detection of the touch screen that the terminal enters the charging mode. The anti-interference device for detection of the touch screen may detect a corresponding interface flag to determine whether the terminal enters a charging state when receiving a notification indicating that the terminal enters the charging mode. When the corresponding interface flag indicating that the terminal enters the charging state is detected, it is determined that the terminal is in the charging mode currently.

At block 102, when the terminal is in the charging mode, a trip point is determined from the plurality of touch points.

In this embodiment, when the plurality of touch points are detected on the touch screen of the terminal, and the terminal is in the charging mode, it is determined whether there is the trip point among the plurality of touch points. When there is the trip point, the trip point is determined from the plurality of touch points.

In an embodiment, for each of the plurality of touch points, a frequency at which the touch point receives the touch signal may be compared with a preset frequency, and the trip point may be determined according to the comparison result. In another embodiment, an active inquiry is made to inquire whether there is the trip point among the plurality of touch points. For example, text such as "please determine whether there is the trip point among the plurality of touch points" is displayed on the screen, and when the user selects the option of "yes", it may be indicated that there is the trip point among the plurality of touch points, and the trip point may be further determined according to a selecting operation performed by the user on the plurality of touch points. In another embodiment, the plurality of touch points may be compared with a historical user touch record corresponding to an application currently running on the terminal, and the trip point may be determined from the plurality of touch points according to the comparison result.

In an embodiment, determining the trip point from the plurality of touch points may include: for each of the plurality of touch points detected on the touch screen, acquiring a frequency at which the touch point receives the touch signal; and searching for, from the plurality of touch points, a target touch point receiving the touch signal at a frequency greater than a preset frequency, and determining the target touch point as the trip point. In an embodiment, the preset frequency may be a preset percentage of a scanning frequency, the preset percentage may be greater than 80%. For example, a scanning frequency of a touch control chip of the touch screen may be 10 ms per time, and the preset percentage is 80%, the preset frequency may be 8 ms per time. When it is detected that there is at least one touch point receiving the touch signal at the frequency greater than the preset frequency among the plurality of touch points, it indicates that there is the trip point among the plurality of touch points, which means that there may be frequently mis-reporting touch point(s) at a certain location or some locations on the touch screen, which may lead to a mis-operation. The at least one touch point receiving the touch signal at the frequency greater than the preset frequency may be determined as the target touch point, and the target touch point may be determined as the trip point. In an embodiment, four touch points including touch point A, touch point B, touch point C and touch point D are detected on the touch screen of the terminal, the frequencies at which the four touch points receive the touch signal are 7 ms per time, 9 ms per time, 9 ms per time and 6 ms per time respectively, the preset frequency is 8 ms per time, and the touch point A and the touch point D are determined as trip points. In an embodiment, when the terminal finds the target touch point receiving the touch signal at the frequency greater than the preset frequency among the plurality of touch points, the user may be prompted that the terminal would automatically determine the target touch point as the trip point and whether the user would like to determine the touch point as the trip point. The user may be prompted in a form of speech broadcasting, or in a form of displaying texts in a dialogue box on the touch screen. Further, a coordinate position of the target touch point may be provided in the form of speech broadcasting or in the form of displaying texts in the dialogue box on the touch screen. When the user sends an operation instruction of determining the target touch point as the trip point, the target touch point may be determined as the trip point.

In an embodiment, determining the trip point from the plurality of touch points may include: displaying the plurality of touch points on the touch screen; and determining the trip point from the plurality of touch points according to a selecting instruction inputted by a user. In an embodiment, when the plurality of touch points are detected on the touch screen of the terminal, and when the terminal is in the charging mode, the plurality of touch points are displayed on the touch screen. It may be displayed on the screen that "please confirm whether there is the trip point among the plurality of touch points", and when the user selects "yes", it indicates that there is the trip point among the plurality of touch points. The user may be prompted that "please selects the trip point among the plurality of touch points according to a preset pattern", in which the user may be prompted in a form of the speech broadcasting or in a form of displaying texts in the dialogue box on the touch screen. The preset pattern may be an enclosed pattern such as a circular, a triangle or a rectangle etc. When the user performs the selecting operation on one or more touch points among the plurality of touch points according to the preset pattern, the one or more touch points selected by the user may be determined as the trip point(s).

In an embodiment, before determining the trip point from the plurality of touch points, the method may further include: determining an application running on the terminal currently; and acquiring a historical user touch record corresponding to the application. In an embodiment, determining the trip point from the plurality of touch points may include: determining the trip point from the plurality of touch points according to the historical user touch record. In an embodiment, the terminal may determine the running application according to a name of a running progress. When there are a plurality of running progresses, the task progress at the top of a task stack is determined as the application running on foreground (the displaying screen) of the terminal. The historical user touch record corresponding to the application running on the terminal is determined according to a pre-stored correspondence table between applications and historical user touch record. The historical user touch record corresponding to the application running on the terminal reflects some touch operations frequently performed by the user on the application. The historical user touch record may include location information of a touch point corresponding to a touch operation frequently performed by the user on the touch screen and a preset touch region including the touch point. The plurality of touch points detected on the touch screen of the terminal are respectively compared with the historical user touch record corresponding to the currently running application, and the trip point is determined among the plurality of touch points according to the comparison result. In an embodiment, when one or more touch points among the plurality of touch points are in conformity with the location information of touch points stored in the historical user touch record, or when the one or more touch points among the plurality of touch points are located in the preset touch region stored in the historical user touch record, the one or more touch points are determined as non-trip points, otherwise, the one or more touch points are determined as the trip points.

In related art, the touch screen provided in the terminal includes a resistive touch screen, a capacitive touch screen and a piezoelectric touch screen etc. When the user touches the touch screen, the touch screen may detect touch information and identify the touch operation of the user. Taking the capacitive touch screen as an example, before the terminal leaves the factory, or when the terminal starts up, or at any moment when a touch screen calibration is needed, the terminal may record a reference capacitance of respective location when the touch screen is not touched. When the user touches the touch screen, the touch screen may sense a change of the capacitance, and when the change (a difference between a current capacitance and the reference capacitance, which is generally an absolute value) is beyond a touch judging threshold, it indicates that the user touches the touch screen, and the touch point and the touch event are reported. When the user touches the screen, the touch information identified by the touch screen at least includes a horizontal coordinate (x-coordinate) and a vertical coordinate (y-coordinate) of the touch point, as well as a size (including length and width) of a contact area and the number of fingers touching the screen and the like. After the touch information is detected, coordinate information is reported to a higher layer via an input system, such that the touch operation at a certain location on the screen may be detected using the touch information, which means that the touch location can be acquired. In order to make the plurality of touch points respectively correspond to the touch operations in the historical user touch record, the location information of the plurality of touch points in embodiments of the present disclosure may correspond respectively to the coordinate information in the touch information in the historical user touch record, i.e., the coordinate information of the plurality of touch points may be represented in a same coordinate system as the coordinate information of the touch operations in the historical user touch record. For example, a left bottom corner of the displaying region of the touch screen is regarded as an origin of coordinates, a width direction is regarded as a horizontal axis, a length direction is regarded as a vertical axis, and the coordinate information may be represented by values on the horizontal axis and the vertical axis.

At block 103, the trip point is prevented from being responsive and touch points other than the trip point in the plurality of touch points are allowed to be responsive.

In an embodiment, after the trip point is determined from the plurality of touch points, the trip point may be prevented from being responsive, and other touch points are allowed to be responsive, so as to respond to the real touch operation of the user. The other touch points are touch points other than the trip point in the plurality of touch points. In an embodiment, when the terminal prepares to prevent the trip point from being responsive and allow the other touch points to be responsive, the user may be prompted that the terminal would automatically shield the touch signal of the trip point and respond to the touch signals of the other touch points, and the user may be inquired whether to prevent the trip point from being responsive and allow the other touch points to be responsive. The user may be prompted in a form of speech broadcasting or in a form of texts in a displaying dialogue box on the touch screen. Further, the user may be informed of coordinate locations of respective touch point and the other touch points in a form of speech broadcasting or in a form of texts in a displaying dialogue box on the touch screen. The location information of the trip point and the other touch points are displayed distinctively in different colors. When the user selects to shield the touch signal of the trip point and respond to the touch signals of the other touch points, a shielding operation is performed on the touch signal of the trip point, and a responding operation is performed on the touch signals of the other touch points. In an embodiment, the number of trip points may be increased or reduced according to the selecting instruction of the user, and then the shielding operation may be performed on the touch signal of respective trip point.

With the solution for responding to the touch operation provided by embodiments of the present disclosure, when a plurality of touch points are detected on a touch screen of a terminal, it is determined whether the terminal is in a charging mode currently. When the terminal is in the charging mode, a trip point is determined from the plurality of touch points. The trip point is prevented from being responsive and touch points other than the trip point in the plurality of touch points are allowed to be responsive. With the above technical solution, a problem of an error response to the touch operation due to a presence of the trip point on the touch screen of the terminal when the terminal is in a charging state may be solved, thereby improving an accuracy and a sensibility of responding to the touch operation when the terminal is charged.

In an embodiment, before determining the trip point from the plurality of touch points, the method may further include: boosting a scheduling priority of the touch screen in a system resource distributing queue. The scheduling priority may be a priority assigned to a task (or a progress) by an operation system of the terminal, which decides a priority order of the task when the task uses system resources. A level of the scheduling priority may reflect a significance and an urgency of the task, and may relate to a priority of the task itself and a scheduling algorithm. The scheduling priority may include a common priority, a medium priority and a high priority. The system may schedule the task according to the scheduling priority, which means that the task with high priority may be performed by the operation system preferentially, the task with medium priority may be performed thereafter, and the task with the common priority may be performed finally. Tasks with same priority may be performed by the operation system according to a time order. The scheduling algorithm may include an event driving scheduling algorithm and a clock driving scheduling algorithm, in which the event driving scheduling algorithm depends on an external hardware device, and is used for scheduling the system resources for the task by generating an interruption. In an embodiment, a task A, a task B and a task C which are ordered according to the time order may be included in a system resource distributing queue of the terminal, and the scheduling priorities of the task A, the task B and the task C are common priorities. In a case that the scheduling priority of the system C is boosted to the high priority while the system is scheduling the system resources for the task A, the system may generate the interruption to stop scheduling the system resources for the task A but schedule the system resources for the task C with the high priority, such that the task C may be processed preferentially. The clock driving scheduling algorithm is a round-robin scheduling algorithm depends on time slices, which means that the scheduling is performed according to the time order. When the scheduling priorities of tasks in the system resource distributing queue are the same, the system resources may be scheduled for the tasks using the clock driving scheduling algorithm. In an embodiment, a task 1, a task 2 and a task 3 which are ordered according to the time order may be included in the system resource distributing queue of the terminal, and the scheduling priorities of the task 1, the task 2 and the task 3 are common priorities, the system may schedule system resources for the three tasks according to the time order. When the plurality of touch points are detected on the touch screen of the terminal, and when the terminal is in the charging mode currently, the scheduling priority of the touch screen may be boosted in the system resource distributing queue, such that the operation system of the terminal may schedule the system resources for the touch screen preferentially, a detection sensibility of the touch screen can be improved, and the trip point may be determined from the plurality of touch points quickly and accurately.

In an embodiment, before boosting the scheduling priority of the touch screen in the system resource distributing queue, the method may further include: acquiring a type of the charging mode of the terminal. In an embodiment, boosting the scheduling priority of the touch screen in the system resource distributing queue may include: boosting the scheduling priority of the touch screen in the system resource distributing queue according to the type of the charging mode of the terminal.

In an embodiment, the type of the charging mode may include a first charging mode and a second charging mode, and a charging voltage in the first charging mode is greater than a charging voltage in the second charging mode. In an embodiment, acquiring the type of the charging mode of the terminal may include: determining whether the terminal communicates with a power adapter; when the terminal communicates with the power adapter, determining that the terminal is in the first charging mode; and when the terminal does not communicate with the power adapter, determining that the terminal is in the second charging mode. Accordingly, boosting the scheduling priority of the touch screen in the system resource distributing queue according to the type of the charging mode of the terminal may include: when the terminal is in the first charging mode, boosting the scheduling priority of the touch screen in the system resource distributing queue to a high priority; and when the terminal is in the second charging mode, boosting the scheduling priority of the touch screen in the system resource distributing queue to a medium priority.

In an embodiment, the first charging mode may be a quick charging mode, and the second charging mode may be a regular charging mode. The charging voltage in the first charging mode is greater than the charging voltage in the second charging mode, and a charging current in the first charging mode is greater than a charging current in the second charging mode. The quick charging mode may be understood as a charging mode using a large charging current and having a fast charging speed. The regular charging mode may be understood as a charging mode using a small charging current and having a slow charging speed. The larger the charging current is, the greater the common mode interference frequency is, the greater the interference in scanning frequency of the touch screen is, and the lower the response sensitivity of the touch screen is. Therefore, when the terminal is in the first charging mode, the scheduling priority of the touch screen is boosted to the high priority in the system resource distributing queue. When the terminal is in the second charging mode, the scheduling priority of the touch screen is boosted to the medium priority in the system resource distributing queue. In an embodiment, the type of the charging mode of the terminal may be determined by determining whether the terminal communicates with the power adapter. In an embodiment, when it is determined that the power adapter is plugged in the terminal, the terminal may try to communicate with the power adapter. When the terminal is supplied with electricity via a power device such as a common power adapter (such as a charger) or a universal serial bus (USB), only VBUS voltage is provided, and the power device does not communicate with a central processing unit (CPU) in the terminal. Therefore, the terminal fails to communicate with the power adapter, i.e., the terminal does not communicate with the power adapter, and it is determined that the terminal is in a regular charging mode. On contrary, there is a smart chip in a quick charging power adapter, and the CPU in the terminal may pre-define some data, such that when the terminal is coupled to the quick charging power adapter to be charged, the quick charging power adapter may send data of a handshake request to the CPU. When the CPU detects that the pre-defined data is the data of the handshake request, a response signal is sent to the quick charging power adapter. When success of both the request and the response occurs, i.e., after the terminal communicates with the power adapter, it is determined that the terminal is in a quick charging mode.

Figure 2:
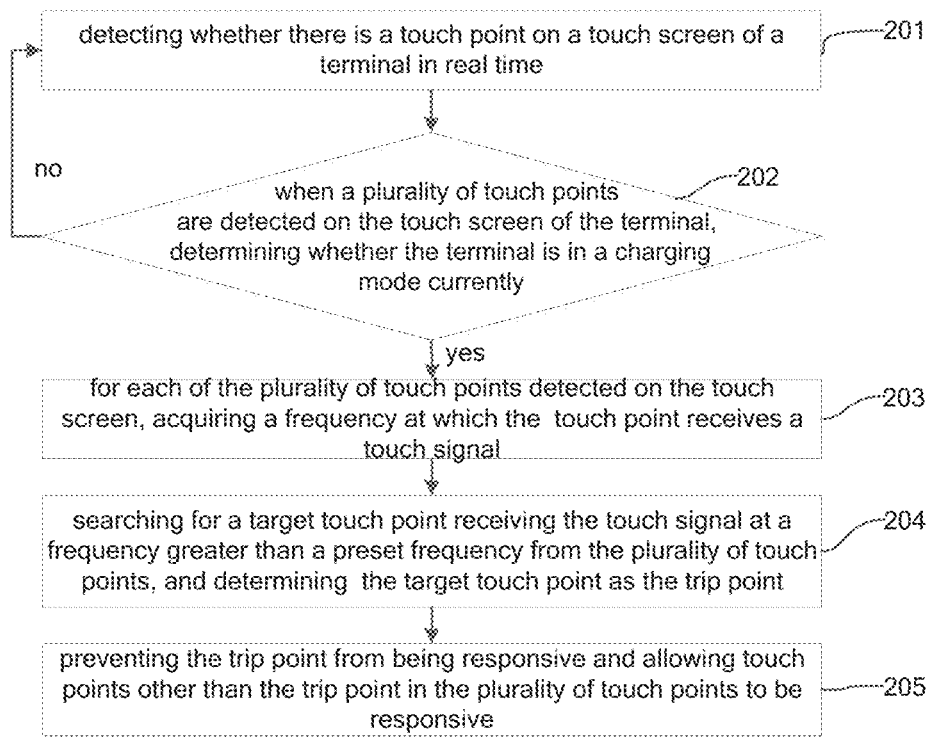
FIG. 2 is a flow chart of a method for responding to a touch operation provided by another embodiment of the present disclosure.

FIG. 2 is a flow chart of a method for responding to a touch operation provided by another embodiment of the present disclosure. As illustrated in FIG. 2, the method may include the followings.

At block 201, it is detected whether there is a touch point on a touch screen of a terminal in real time.

At block 202, when a plurality of touch points are detected on the touch screen of the terminal, it is determined whether the terminal is in a charging mode currently. When the terminal is in the charging mode currently, act at block 203 is executed, otherwise, act at block 201 is executed.

At block 203, for each of the plurality of touch points detected on the touch screen, a frequency at which the touch point receives a touch signal is acquired.

At block 204, a target touch point receiving the touch signal at a frequency greater than a preset frequency is searched for from the plurality of touch points, and the target touch point is determined as the trip point.

At block 205, the trip point is prevented from being responsive and touch points other than the trip point in the plurality of touch points are allowed to be responsive.

With the solution for responding to a touch operation provided by embodiments of the present disclosure, for each of the plurality of touch points detected on the touch screen, the frequency at which the touch point receives the touch signal is acquired, the target touch point receiving the touch signal at a frequency greater than the preset frequency is searched for from the plurality of touch points, and the target touch point is determined as the trip point. By using the above described technical solution, not only a problem of mis-operation due to the frequently mis-reporting touch points at a certain location or some locations on the touch screen when the terminal is in the charging mode may be solved effectively, but also influences of the mis-reporting touch points to other touch points responding to the touch operations may be eliminated, such that an accuracy of responding to the touch operation when the terminal is charged may be improved.

Figure 3:
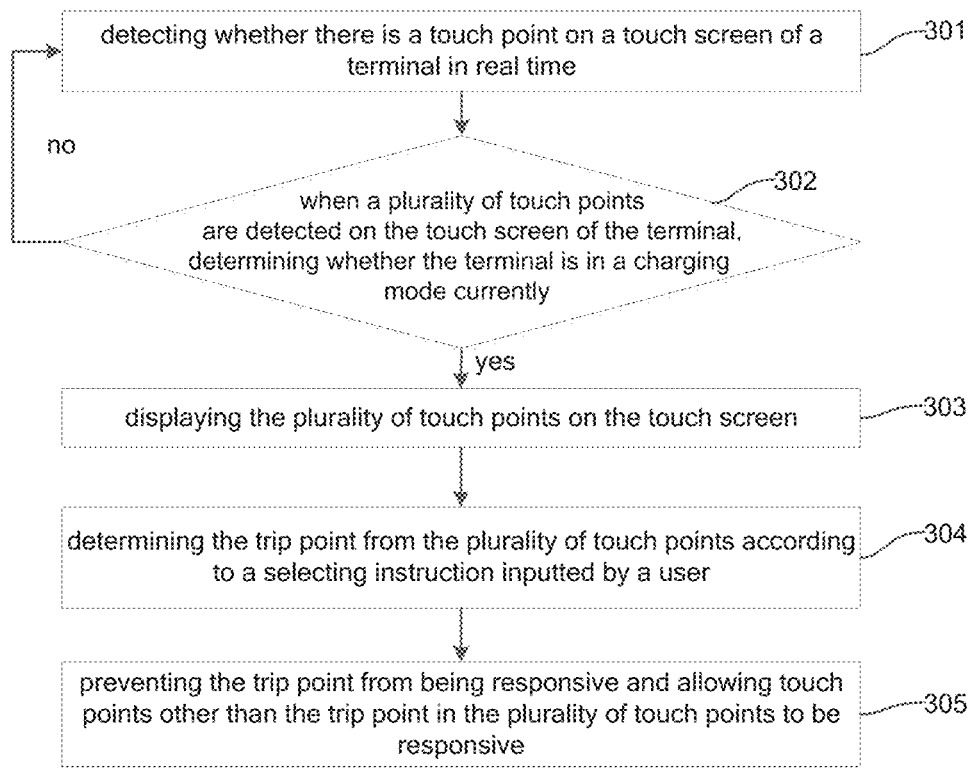
FIG. 3 is a flow chart of a method for responding to a touch operation provided by yet another embodiment of the present disclosure.

FIG. 3 is a flow chart of a method for responding to a touch operation provided by yet another embodiment of the present disclosure. As illustrated in FIG. 3, the method may include the followings.

At block 301, it is detected whether there is a touch point on a touch screen of a terminal in real time.

At block 302, when a plurality of touch points are detected on the touch screen of the terminal, it is determined whether the terminal is in a charging mode currently. When the terminal is in the charging mode currently, act at block 303 is executed, otherwise, act at block 301 is executed.

At block 303, the plurality of touch points are displayed on the touch screen.

At block 304, the trip point is determined from the plurality of touch points according to a selecting instruction inputted by a user.

At block 305, the trip point is prevented from being responsive and touch points other than the trip point in the plurality of touch points are allowed to be responsive.

With the method for responding to a touch operation provided by embodiments of the present disclosure, the trip point is determined from the plurality of touch points according to the selecting instruction inputted by the user, and influences of the trip point to other touch points responding to the touch operations may be eliminated, such that not only an accuracy and an authenticity of determining the trip point may be improved according to the user's selecting operation, but also an accuracy and a sensibility of the touch screen responding to the user's operation when the terminal is charged may be further improved.

Figure 4:
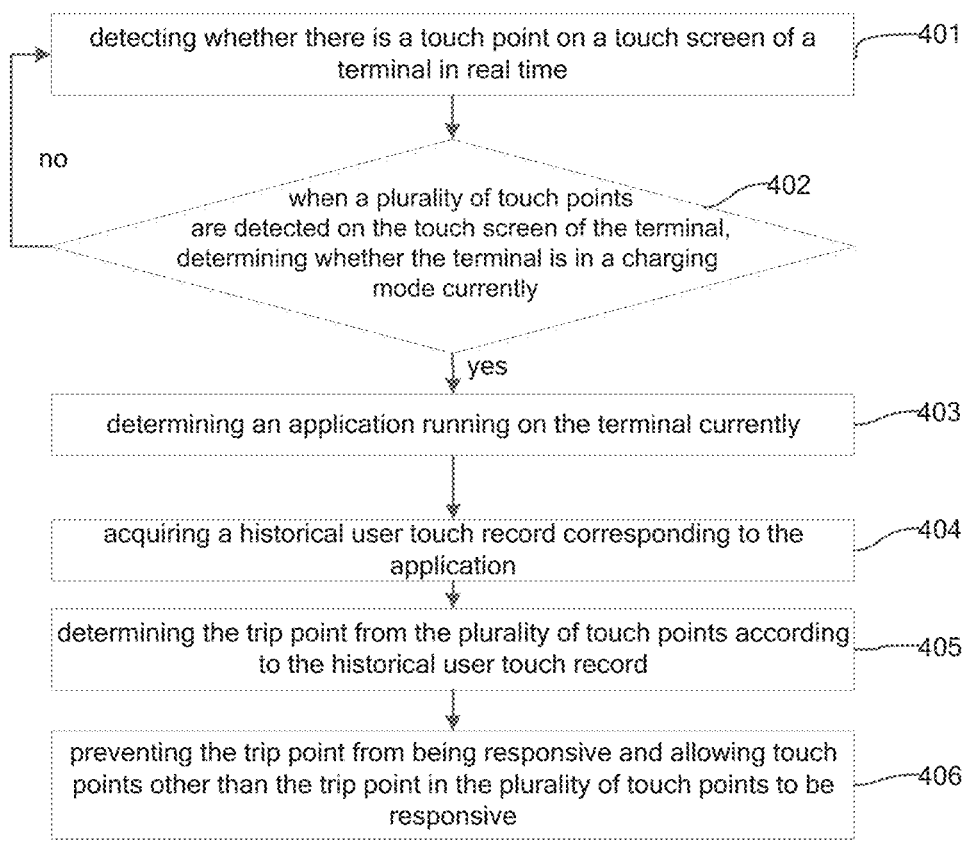
FIG. 4 is a flow chart of a method for responding to a touch operation provided by a still embodiment of the present disclosure.

FIG. 4 is a flow chart of a method for responding to a touch operation provided by still another embodiment of the present disclosure. As illustrated in FIG. 4, the method may include the followings.

At block 401, it is detected whether there is a touch point on a touch screen of a terminal in real time.

At block 402, when a plurality of touch points are detected on the touch screen of the terminal, it is determined whether the terminal is in a charging mode currently. When the terminal is in the charging mode currently, act at block 403 is executed, otherwise, act at block 401 is executed.

At block 403, an application running on the terminal currently is determined.

In an embodiment, the terminal may determine the running application according to a name of a running progress. When there are a plurality of running progresses, the task progress at the top of a task stack is determined as the application running on foreground (the displaying screen) of the terminal.

At block 404, a historical user touch record corresponding to the application is acquired.

In an embodiment, the historical user touch record corresponding to the application running on the terminal currently is determined according to a pre-stored correspondence table between the applications and the historical user touch record.

At block 405, the trip point is determined from the plurality of touch points according to the historical user touch record.

At block 406, the trip point is prevented from being responsive and touch points other than the trip point in the plurality of touch points are allowed to be responsive.

With the method for responding to the touch operation provided by embodiments of the present disclosure, the trip point is determined from the plurality of touch points according to the historical user touch record corresponding to the application running on the terminal currently. In this way, the real touch operation of the user for the current application may be reflected, and an accuracy of responding to the touch operation when the terminal is charged may be further improved.

Figure 5:
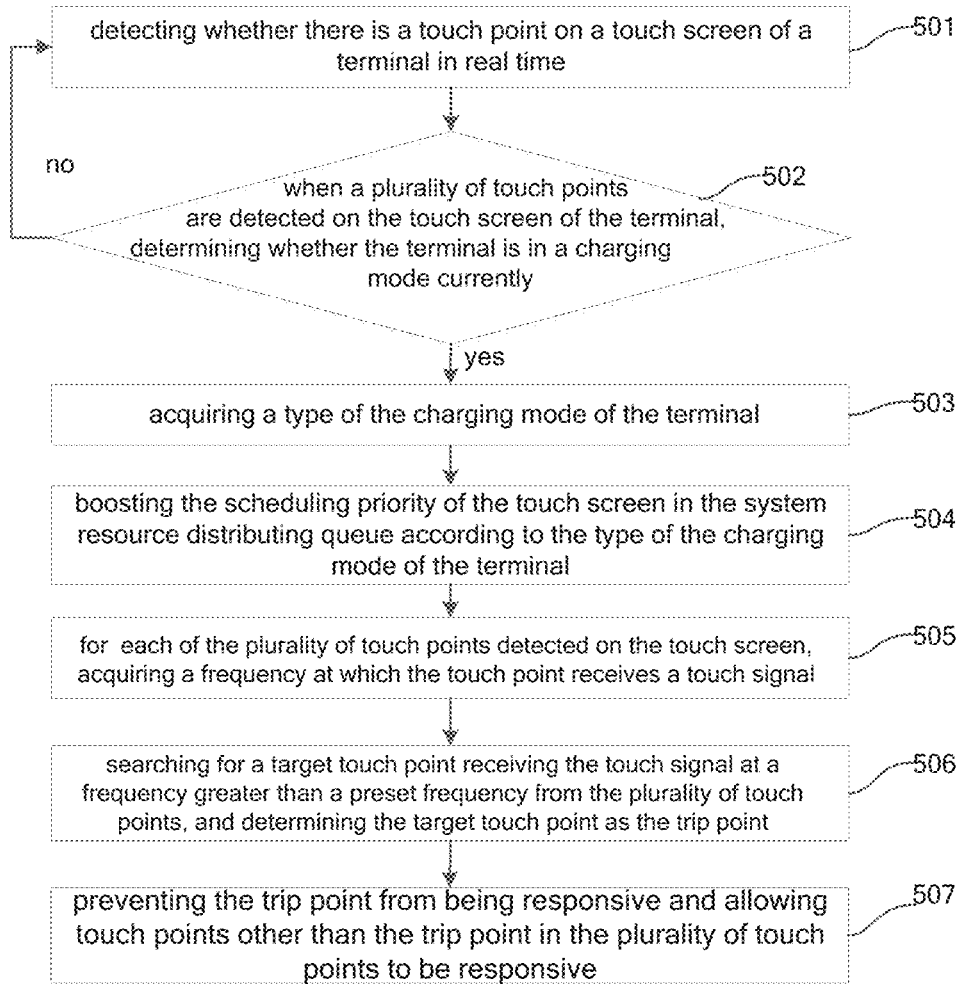
FIG. 5 is a flow chart of a method for responding to a touch operation provided by still another embodiment of the present disclosure.

FIG. 5 is a flow chart of a method for responding to a touch operation provided by yet still another embodiment of the present disclosure. As illustrated in FIG. 5, the method may include the followings.

At block 501, it is detected whether there is a touch point on a touch screen of a terminal in real time.

At block 502, when a plurality of touch points are detected on the touch screen of the terminal, it is determined whether the terminal is in a charging mode currently. When the terminal is in the charging mode currently, act at block 503 is executed, otherwise, act at block 501 is executed.

At block 503, a type of the charging mode of the terminal is acquired.

At block 504, the scheduling priority of the touch screen in the system resource distributing queue is boosted according to the type of the charging mode of the terminal.

At block 505, for each of the plurality of touch points detected on the touch screen, a frequency at which the touch point receives a touch signal is acquired.

At block 506, a target touch point receiving the touch signal at a frequency greater than a preset frequency is searched for from the plurality of touch points, and the target touch point is determined as the trip point.

At block 507, the trip point is prevented from being responsive and touch points other than the trip point in the plurality of touch points are allowed to be responsive.

With the method for responding to the touch operation provided by embodiments of the present disclosure, when a plurality of touch points are detected on the touch screen of the terminal, and when the terminal is in the charging mode, the scheduling priority of the touch screen may be boosted in the system resource distributing queue according to the type of the charging mode of the terminal, such that a detection sensibility of the touch screen can be improved, and the trip point may be determined from the plurality of touch points quickly and accurately.

Figure 6:
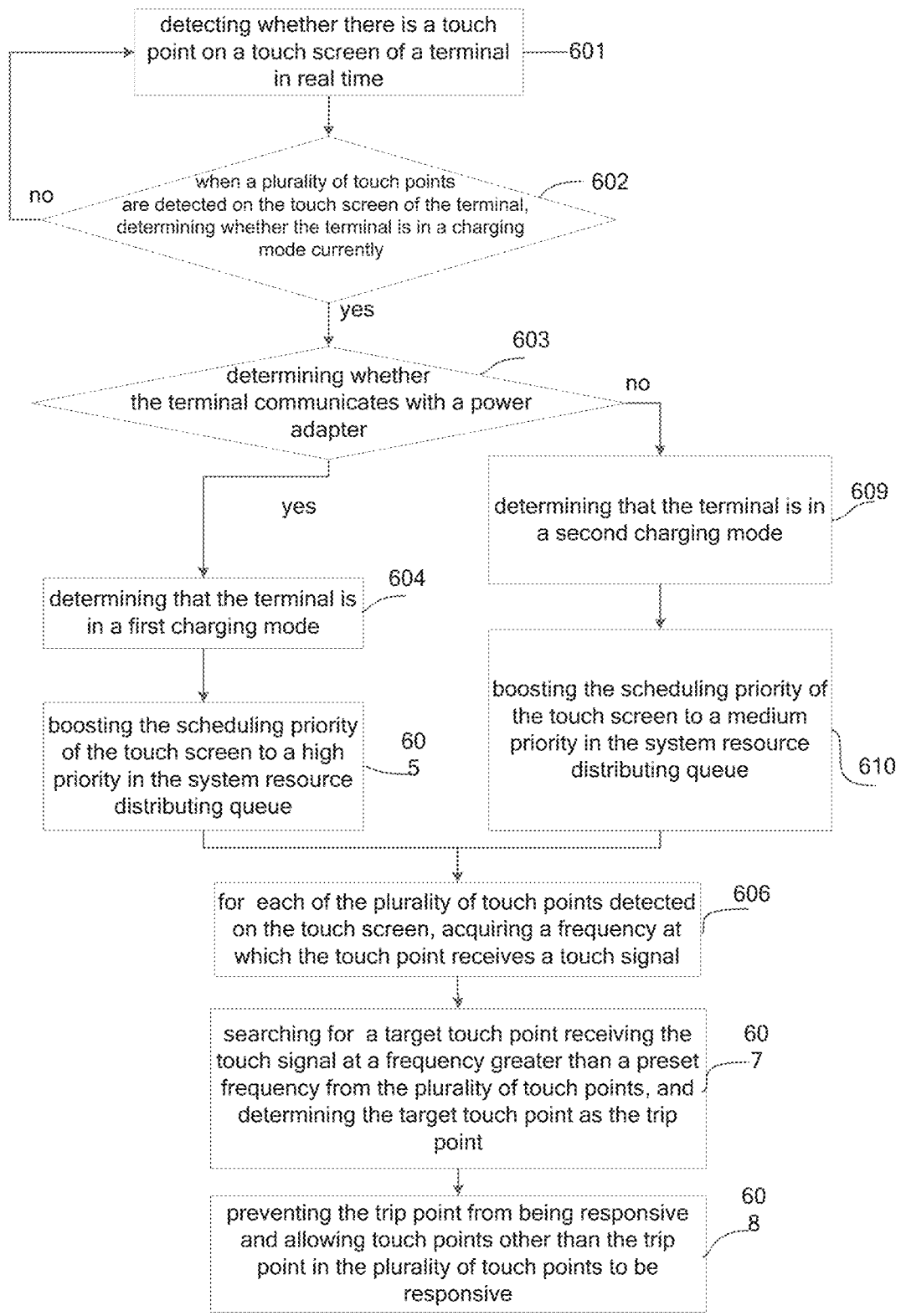
FIG. 6 is a flow chart of a method for responding to a touch operation provided by yet still another embodiment of the present disclosure.

FIG. 6 is a flow chart of a method for responding to a touch operation provided by yet still another embodiment of the present disclosure. As illustrated in FIG. 6, the method may include the followings.

At block 601, it is detected whether there is a touch point on a touch screen of a terminal in real time.

At block 602, when a plurality of touch points are detected on the touch screen of the terminal, it is determined whether the terminal is in a charging mode currently. When the terminal is in the charging mode currently, act at block 603 is executed, otherwise, act at block 601 is executed.

At block 603, it is determined whether the terminal communicates with a power adapter. When the terminal communicates with a power adapter, act at block 604 is executed, otherwise, act at block 609 is executed.

At block 604, it is determined that the terminal is in a first charging mode.

At block 605, the scheduling priority of the touch screen is boosted to a high priority in the system resource distributing queue.

At block 606, for each of the plurality of touch points detected on the touch screen, a frequency at which the touch point receives a touch signal is acquired.

At block 607, a target touch point receiving the touch signal at a frequency greater than a preset frequency is searched for from the plurality of touch points, and the target touch point is determined as the trip point.

At block 608, the trip point is prevented from being responsive and touch points other than the trip point in the plurality of touch points are allowed to be responsive.

At block 609, it is determined that the terminal is in a second charging mode.

At block 610, the scheduling priority of the touch screen is boosted to a medium priority in the system resource distributing queue, and act at block 606 is executed.

With the method for responding to the touch operation provided by embodiments of the present disclosure, when a plurality of touch points are detected on the touch screen of the terminal, and when the terminal is in the charging mode, the scheduling priority of the touch screen may be boosted in the system resource distributing queue according to the type of the charging mode of the terminal, and the target touch point receiving the touch signal at the frequency greater than a preset frequency searched from the plurality of touch points is determined as the trip point, such that not only a detection sensibility of the touch screen can be improved, but also the trip point may be determined from the plurality of touch points quickly and accurately. Moreover, a problem of mis-operation due to the frequently mis-reporting touch points at a certain location or some locations on the touch screen when the terminal is in the charging mode may be solved effectively, and influences of the mis-reporting touch points to other touch points responding to the touch operation may be eliminated, such that an accuracy of responding to the touch operation when the terminal is charged may be improved.

Figure 7:
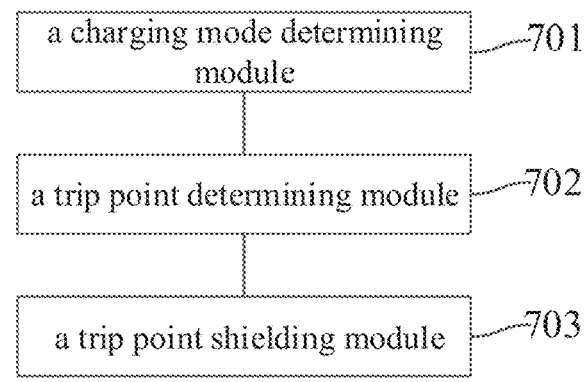
FIG. 7 is a block diagram of an apparatus for responding to a touch operation provided by an embodiment of the present disclosure.

FIG. 7 is a block diagram of an apparatus for responding to a touch operation provided by an embodiment of the present disclosure. The apparatus may be realized by software and/or hardware and generally integrated in a terminal, and may respond to the touch operation by performing the touch operation. As illustrated in FIG. 7, the apparatus may include: a charging mode determining module 701, a trip point determining module 702 and a trip point shielding module 703.

The charging mode determining module 701 is configured to determine whether the terminal is in a charging mode currently when a plurality of touch points are detected on a touch screen of a terminal.

The trip point determining module 702 is configured to determine a trip point from the plurality of touch points when the terminal is in the charging mode.

The trip point shielding module 703 is configured to prevent the trip point from being responsive and allow touch points other than the trip point in the plurality of touch points to be responsive.

With the solution for responding to the touch operation provided by embodiments of the present disclosure, when a plurality of touch points are detected on a touch screen of a terminal, it is determined whether the terminal is in a charging mode currently. When the terminal is in the charging mode, a trip point is determined from the plurality of touch points. The trip point is prevented from being responsive and touch points other than the trip point in the plurality of touch points are allowed to be responsive. With the above technical solution, a problem of an error response to the touch operation due to a presence of the trip point on the touch screen of the terminal when the terminal is in a charging state may be solved, thereby improving an accuracy and a sensibility of responding to the touch operation when the terminal is charged.

In an embodiment, the trip point determining module may be configured to: for each of the plurality of touch points, acquire a frequency at which the touch point receives a touch signal; and search for, from the plurality of touch points, a target touch point receiving the touch signal at a frequency greater than a preset frequency, and determine the target touch point as the trip point.

In an embodiment, the trip point determining module may be configured to: display the plurality of touch points on the touch screen; and determine the trip point from the plurality of touch points according to a selecting instruction inputted by a user.

Further, the apparatus may also include an application determining module and a touch record acquiring module. The application determining module is configured to determine an application running on the terminal currently before the trip point is determined from the plurality of touch points. The touch record acquiring module is configured to acquire a historical user touch record corresponding to the application. Accordingly, the trip point determining module is configured to: determine the trip point from the plurality of touch points according to the historical user touch record.

Further, the apparatus may include a scheduling priority boosting module, configured to boost a scheduling priority of the touch screen in a system resource distributing queue.

Further, the apparatus may include a charging mode type acquiring module, configured to acquire a type of the charging mode of the terminal before the scheduling priority of the touch screen in the system resource distributing queue is boosted. Accordingly, the scheduling priority boosting module is configured to boost the scheduling priority of the touch screen in the system resource distributing queue according to the type of the charging mode of the terminal.

In an embodiment, the type of the charging mode may include a first charging mode and a second charging mode, and a charging voltage in the first charging mode is greater than a charging voltage in the second charging mode.

The charging mode type acquiring module may be configured to determine whether the terminal communicates with a power adapter; when the terminal communicates with the power adapter, to determine that the terminal is in the first charging mode; and when the terminal does not communicate with the power adapter, to determine that the terminal is in the second charging mode.

Accordingly, the scheduling priority boosting module may be configured to: when the terminal is in the first charging mode, boost the scheduling priority of the touch screen in the system resource distributing queue to a high priority; and when the terminal is in the second charging mode, boost the scheduling priority of the touch screen in the system resource distributing queue to a medium priority.

Embodiments of the present disclosure also provide a storage medium including computer executable instructions, in which when the computer executable instructions are executed by a computer processor, a method for responding to a touch operation may be performed. The method may include: when a plurality of touch points are detected on a touch screen of a terminal, determining whether the terminal is in a charging mode currently; when the terminal is in the charging mode, determining a trip point from the plurality of touch points; and preventing the trip point from being responsive and allowing touch points other than the trip point in the plurality of touch points to be responsive.

The storage medium may include any type of memory devices or storage devices. The term "storage medium" aims at including: an installing medium such as a CD-ROM, a floppy disk or a magnetic tape apparatus; a computer system memory or random access memory, such as DRAM. DDR RAM, SRAM, EDO RAM, Rambus RAM and the like; a nonvolatile memory, such as a flash memory, a magnetic medium (such as a hard disk or an optical storage); a register or other similar types of memory elements. The storage medium may also include other types of memories or their combinations. Further, storage medium may be located in a first computer system in which programs are executed, or may be located in a different second computer system, and the second computer system is connected to the first computer system via a network (such as Internet). The second computer system may provide program instructions to the first computer for execution. The term "storage medium" may include two or more storage mediums that reside in different locations (for example, in different computer systems connected via a network). The storage medium may store program instructions that can be executed by one or more processors (for example, specifically implemented as computer programs).

Of course, computer executable instructions included in the storage medium provided by embodiment of the present invention are not limited to perform the touch operation as described above, which may also perform relevant operations in the method for responding to a touch operation provided by any embodiment of the present disclosure.

Figure 8:
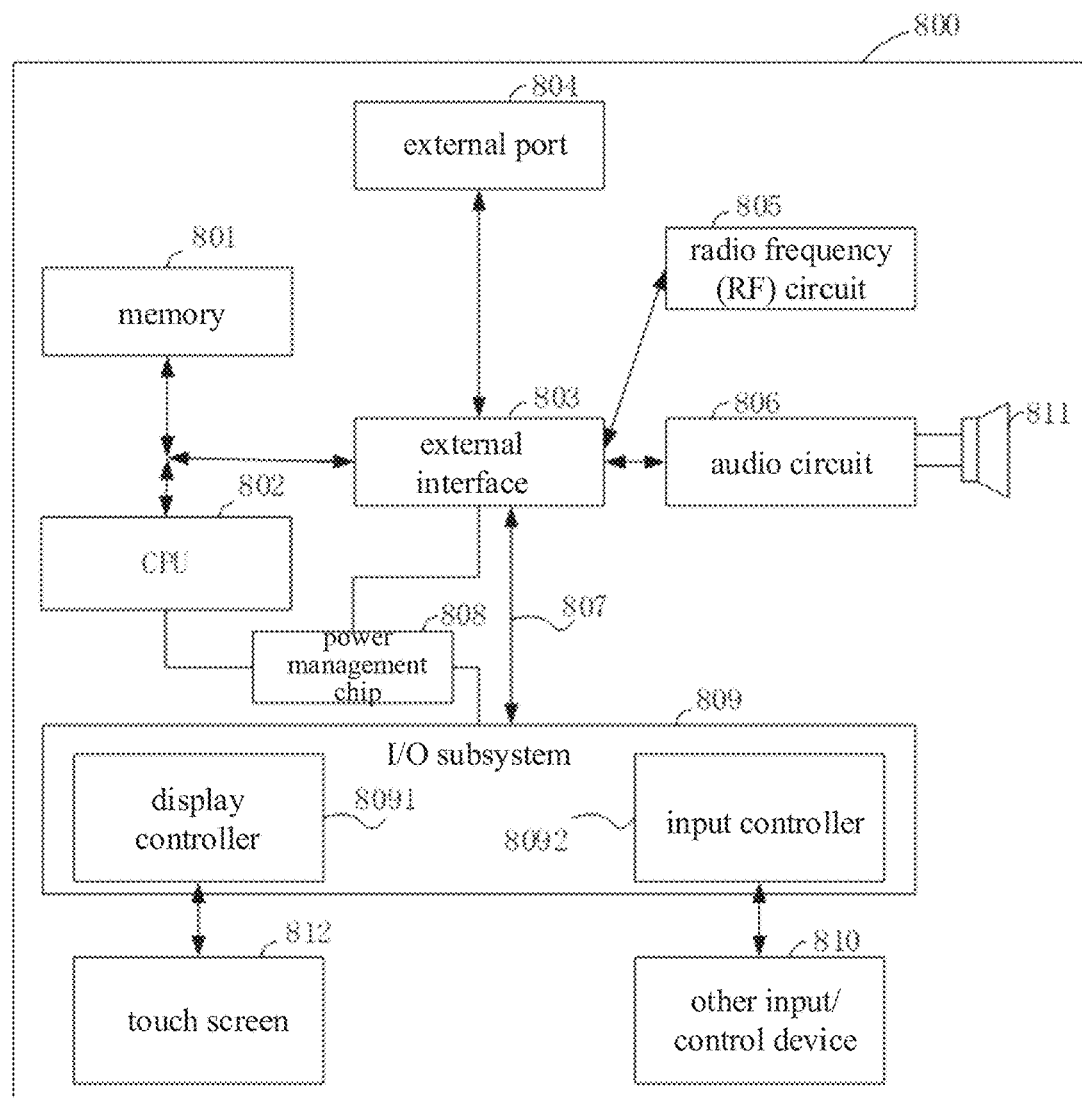
FIG. 8 is a schematic diagram of a terminal provided by an embodiment of the present disclosure.

Embodiment of the present disclosure provide a terminal, in which an apparatus for responding to a touch operation provided by embodiments of the present disclosure is integrated. FIG. 8 is a schematic diagram of a terminal provided by an embodiment of the present disclosure. As illustrated in FIG. 8, the terminal max include: a housing (not illustrated in the figure), a memory 801, a central processing unit 802 (also known as a processor, hereinafter referred to as a CPU for short), a circuit board (not illustrated in the figure) and a power circuit (not illustrated in the figure). The circuit board is arranged inside of a space enclosed by the housing; the CPU 802 and the memory 801 are arranged on the circuit board. The power supply circuit is configured to supply power to respective circuit or component of the terminal, and the memory 801 is configured to store executable program codes. The CPU 802 runs computer programs corresponding to the executable program codes by reading the executable program codes stored in the memory 801, so as to perform: when a plurality of touch points are detected on a touch screen of a terminal, determining whether the terminal is in a charging mode currently; when the terminal is in the charging mode, determining a trip point from the plurality of touch points; and preventing the trip point from being responsive and allowing touch points other than the trip point in the plurality of touch points to be responsive.

The terminal also includes: an external interface 803, a radio frequency (RF) circuit 805, an audio circuit 806, a speaker 811, a power management chip 808, an input/output (I/O) subsystem 809, a touch screen 812, other input/control device 810 and external port 804, these components communicate via one or more communication bus or signal lines 807.

It may be understood that the terminal 800 illustrated in the figure is merely an example of a terminal, and the terminal 800 may have more or fewer components than those illustrated in the figure, may combine two or more components, or may have different component configurations. Various components illustrated in the figure can be implemented in hardware, software, or a combination of hardware and software which include one or more signal processing and/or application-specific integrated circuits.

The terminal for responding to a touch operation provided by embodiments of the present disclosure may be described in detail below, a mobile phone is taken as an example of the terminal.

The memory 801 may be accessed by the CPU 802, the external interface 803 and the like. The memory 801 may not only include a high-speed random access memory, but also may include a non-volatile memory, such as one or more disk memory components, flash memory components, or other volatile solid-state memory components.

The external interface 803 may connect the input and output peripherals to the CPU 802 and the memory 801.

The I/O subsystem 809 may connect the input and output peripherals on the device such as the touch screen 812 and other input/control devices 810 to the external interface 803. The I/O subsystem 809 may include a display controller 8091 and one or more input controllers 8092 for controlling other input/control devices 810. The one or more input controllers 8092 receive an electrical signal from other input/control devices 810 or send the electrical signal to other input/control devices 810, and the other input/control devices 810 may include a physical button (press button, rocker button, etc.), a dial plate, a slide switch, a joystick, a click wheel. It should be noted that the input controller 8092 may be connected to any of the following: a keyboard, an infrared port, a USB interface and an indicator device such as a mouse.

The touch screen 812 is an input interface and an output interface between the user terminal and the user, displaying a visual output to the user, in which the visual output may include a graphic, a text, an icon, a video and the like.

The display controller 8091 in the I/O subsystem 809 receives an electrical signal from the touchscreen 812 or sends the electrical signal to the touch screen 812. The touch screen 812 detects a contact on the touch screen, the display controller 8091 converts the detected contact to an interaction with the user interface object displayed on the touch screen 812, which means that a human-computer interaction may be realized. The user interface object displayed on the touch screen 812 may be an icon for running a game, an icon of a corresponding network to be accessed to. It should be noted that the device may also include a light mouse that does not show visual output of touch sensitive surfaces, or a touch-sensitive surface formed by a touch-screen extension.

The RF circuit 805 is mainly configured to establish a communication between the mobile phone and a wireless network (i.e., the network side), realizing a data reception and a transmission between the mobile phone and the wireless network. For example, short messages, e-mail and the like may be sent and received. Specifically, the RF circuit 805 receives and sends an RF signal which also known as an electromagnetic signal, the RF circuit 805 may convert an electrical signal to an electromagnetic signal or convert the electromagnetic signal to the electrical signal, and communicate with a communication network and other devices via the electromagnetic signal. The RF circuit 8005 may include known circuits configured to perform these functions, which includes but not limited to an antenna system, an RF transceiver, one or more amplifiers, a tuner, one or more oscillators, a digital signal processor, a CODEC chipset, a user identification module (SIM) and the like.

The audio circuit 806 is mainly configured to receive audio data from the external interface 803, converting the audio data to an electrical signal and sending the electrical signal to the speaker 811.

The speaker 811 is configured to restore a speech signal received by the mobile phone from the wireless network via the RF circuit 805 to a voice, and to play the voice to the user.

The power management chip 808 is configured to supply power and to perform a power management for hardware connected to the CPU 802, the I/O subsystem, and the external interface.

The apparatus for responding to the touch operation, the storage medium and the terminal provided in the above embodiments may perform the method for responding to the touch operation provided by any embodiment of the present disclosure, and have the function module and beneficial effect of the corresponding method. Regarding technical details not described in detail in the above embodiments, reference may be made to the method for responding to the touch operation provided by any embodiment of the present disclosure.

It should be noted that, the above is merely preferred embodiment of the present disclosure and the applied technical principle. The skilled in the art will understand that the present disclosure is not limited to the specific embodiments described herein, and that it is possible for the skilled in the art to perform various obvious changes, adjustments and replacements without being separated from the scope of present disclosure. Therefore, although the present disclosure is described in detail by the above embodiments, the present disclosure is not limited to the above embodiments. The present disclosure may include more other equivalent embodiments without being separated from the idea of the present disclosure, and the scope of the present disclosure is determined by the scope of the pending claim.

What is claimed is:

1. A method for responding to a touch operation, comprising:
   when a plurality of touch points are detected on a touch screen of a terminal, determining whether the terminal is in a charging mode currently;
   when the terminal is in the charging mode, determining a trip point from the plurality of touch points, wherein the trip point comprises a malfunctioning touch point; and
   preventing the trip point from being responsive and allowing touch points other than the trip point in the plurality of touch points to be responsive;
   wherein determining the trip point from the plurality of touch points comprises:
   acquiring, for each of the plurality of touch points, a frequency at which the touch point receives a touch signal; and
   searching for, from the plurality of touch points, a target touch point receiving the touch signal at a frequency greater than a preset frequency, and determining the target touch point as the trip point.

2. The method according to claim 1, wherein the preset frequency is a preset percentage of a scanning frequency of a touch control chip of the touch screen.

3. The method according to claim 1, wherein determining the trip point from the plurality of touch points comprises:
   displaying the plurality of touch points on the touch screen; and
   determining the trip point from the plurality of touch points according to a selecting instruction inputted by a user.

4. The method according to claim 1, wherein the method further comprises:
   determining an application running on the terminal currently; and
   acquiring a historical user touch record corresponding to the application;
   wherein determining the trip point from the plurality of touch points comprises:
   determining the trip point from the plurality of touch points according to the historical user touch record.

5. The method according to claim 4, wherein determining the application running on the terminal currently comprises:
   when there are a plurality of running processes, determining a task process at a top of a task stack as the application running on the terminal currently.

6. The method according to claim 4, wherein determining the trip point from the plurality of touch points according to the historical user touch record comprises:
   comparing the plurality of touch points with the historical user touch record corresponding to the application one by one; and
   determining the trip point from the plurality of touch points according to a comparison result.

7. The method according to claim 6, wherein determining the trip point from the plurality of touch points according to a comparison result comprises:
   determining one of the plurality of touch points as the trip point when one of following conditions is met:
   the one of the plurality of touch points being in conformity with location information of touch points stored in the historical user touch record; and
   the one of the plurality of touch points being located in a preset touch region stored in the historical user touch record.

8. The method according to claim 1, wherein before determining the trip point from the plurality of touch points, the method further comprises:
   boosting a scheduling priority of the touch screen in a system resource distributing queue.

9. The method according to claim 8, wherein the method further comprises:
   acquiring a type of the charging mode of the terminal;
   wherein boosting the scheduling priority of the touch screen in the system resource distributing queue comprises:
   boosting the scheduling priority of the touch screen in the system resource distributing queue according to the type of the charging mode of the terminal.

10. The method according to claim 9, wherein the type of the charging mode comprises a first charging mode and a second charging mode, and a charging voltage in the first charging mode is greater than a charging voltage in the second charging mode;

acquiring the type of the charging mode of the terminal comprises: determining whether the terminal communicates with a power adapter; when the terminal communicates with the power adapter, determining that the terminal is in the first charging mode; and when the terminal does not communicate with the power adapter, determining that the terminal is in the second charging mode;

boosting the scheduling priority of the touch screen in the system resource distributing queue according to the type of the charging mode of the terminal comprises: when the terminal is in the first charging mode, boosting the scheduling priority of the touch screen in the system resource distributing queue to a first priority; and when the terminal is in the second charging mode, boosting the scheduling priority of the touch screen in the system resource distributing queue to a second priority; wherein the first priority is higher than the second priority.

11. The method according to claim 8, wherein the scheduling priority is assigned to a task by an operating system of the terminal and related to a priority of the task and a scheduling algorithm, in which the scheduling algorithm comprises at least one of an event driving scheduling algorithm and a clock driving scheduling algorithm.

12. The method according to claim 1, wherein the plurality of touch points detected on the touch screen comprise a plurality of touch points detected in any interface displayed on the touch screen currently, wherein the interface displayed on the touch screen comprises one of a desktop, and an application page, and the application page comprises at least one of a video playing page, a webpage viewing page, a chatting page and a payment page.

13. The method according to claim 1, further comprising: determining whether the plurality of touch points are detected on the touch screen comprising:
receiving a touch signal at a touch point and converting the touch signal to an electric pulse;
transferring the electric pulse to a touch screen control integrated circuit for processing;
performing an action corresponding to the processed electric pulse so as to report a signal for the touch point;
determining that the touch point is detected on the touch screen when the reported signal for the touch point is received.

14. The method according to claim 1, wherein determining whether the terminal is in the charging mode currently comprising:
notifying, by a main control chip of the terminal, an anti-interference device for detection of the touch screen that the terminal enters the charging mode;
detecting by the anti-interference device a corresponding interface flag to determine whether the terminal enters a charging state;
determining that the terminal is in the charging mode currently when the corresponding interface flag indicating that the terminal enters the charging state.

15. The method according to claim 1, further comprising:
prompting a user to choose whether to shield the touch signal of the trip point and respond to the touch signals of the touch points other than the trip point;
wherein preventing the trip point from being responsive and allowing the touch points other than the trip point to be responsive comprises:

shielding the touch signal of the trip point and responding to the touch signals of the touch points other than the trip point, when the user choose to shield the touch signal of the trip point and respond to the touch signals of the touch points other than the trip point.

16. The method according to claim 15, wherein prompting the user that the terminal would automatically shield a touch signal of the trip point and respond to touch signals of the touch points other than the trip point comprises:
prompting the user in a form of broadcasting a speech or displaying text in a dialog on the touch screen.

17. The method according to claim 1, further comprising:
displaying coordinate locations of the trip point and the touch points other than the trip point, wherein the coordinate location of the trip point is displayed in a color different from that for displaying the coordinate locations of the touch points other than the trip point.

18. A non-transitory computer-readable storage medium, having a computer program stored thereon, wherein when the computer program is executed by a processor, the processor is caused to perform the method for responding to the touch operation, comprising:
when a plurality of touch points are detected on a touch screen of a terminal, determining whether the terminal is in a charging mode currently;
when the terminal is in the charging mode, determining a trip point from the plurality of touch points, wherein the trip point comprises a malfunctioning touch point; and
preventing the trip point from being responsive and allowing touch points other than the trip point in the plurality of touch points to be responsive;
wherein determining the trip point from the plurality of touch points comprises:
acquiring, for each of the plurality of touch points, a frequency at which the touch point receives a touch signal; and
searching for, from the plurality of touch points, a target touch point receiving the touch signal at a frequency greater than a preset frequency, and determining the target touch point as the trip point.

19. A terminal, comprising a memory, a processor and a computer program stored on the memory and executable by the processor, wherein when the processor executes the computer program, the processor is caused to perform the method for responding to the touch operation, comprising:
when a plurality of touch points are detected on a touch screen of a terminal, determining whether the terminal is in a charging mode currently;
when the terminal is in the charging mode, determining a trip point from the plurality of touch points, wherein the trip point comprises a malfunctioning touch point; and
preventing the trip point from being responsive and allowing touch points other than the trip point in the plurality of touch points to be responsive;
wherein determining the trip point from the plurality of touch points comprises:
acquiring, for each of the plurality of touch points, a frequency at which the touch point receives a touch signal; and
searching for, from the plurality of touch points, a target touch point receiving the touch signal at a frequency greater than a preset frequency, and determining the target touch point as the trip point.

* * * * *